US006966198B2

(12) United States Patent
Piccirilli et al.

(10) Patent No.: US 6,966,198 B2
(45) Date of Patent: Nov. 22, 2005

(54) AIR-CYCLE AIR CONDITIONING SYSTEM FOR COMMERCIAL REFRIGERATION

(75) Inventors: Davide Fausto Piccirilli, Livonia, MI (US); Thomas Paul Gielda, Brighton, MI (US); David Duong, Oxford, MI (US); Ed Smallhorn, Dartmouth (CA); Mitchell Vitale, Westland, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 76 days.

(21) Appl. No.: 10/734,520

(22) Filed: Dec. 12, 2003

(65) Prior Publication Data

US 2005/0126204 A1 Jun. 16, 2005

(51) Int. Cl.[7] ............................ F25D 9/00; F25D 19/02
(52) U.S. Cl. ............................ 62/402; 62/88; 62/448
(58) Field of Search ............................ 62/401, 402, 86, 62/87, 88, 172, 448, 449, 450

(56) References Cited

U.S. PATENT DOCUMENTS

| 3,045,447 | A | | 7/1962 | Wagenius |
| 3,151,471 | A | * | 10/1964 | Weil ............................ 62/332 |
| 3,657,898 | A | | 4/1972 | Ness et al. |
| 3,686,893 | A | | 8/1972 | Edwards |
| 3,965,697 | A | | 6/1976 | Beierwaltes |
| 3,967,466 | A | * | 7/1976 | Edwards ....................... 62/402 |
| 4,291,547 | A | | 9/1981 | Leo |
| 4,328,684 | A | * | 5/1982 | Leo ............................ 62/402 |
| 5,038,583 | A | | 8/1991 | Gali |
| 5,121,610 | A | * | 6/1992 | Atkinson et al. ............. 62/151 |
| 5,402,967 | A | * | 4/1995 | Hughes ................... 244/129.2 |
| 5,642,629 | A | | 7/1997 | Ohman |
| 5,709,103 | A | | 1/1998 | Williams |
| 5,732,560 | A | | 3/1998 | Thuresson et al. |
| 5,744,896 | A | | 4/1998 | Kessinger, Jr. et al. |
| 5,768,896 | A | | 6/1998 | Kline et al. |
| 5,823,008 | A | * | 10/1998 | Nikai et al. ................... 62/401 |
| 6,381,973 | B1 | * | 5/2002 | Bhatti et al. .................. 62/172 |
| 6,599,112 | B2 | | 7/2003 | Heizer |
| 6,658,873 | B2 | * | 12/2003 | Clarke et al. ................. 62/172 |
| 6,672,081 | B1 | * | 1/2004 | Albaroudi et al. ............. 62/87 |
| 6,681,591 | B2 | * | 1/2004 | Defrancesco et al. ......... 62/401 |
| 6,792,771 | B2 | * | 9/2004 | Piao et al. .................... 62/401 |
| 2004/0060317 | A1 | * | 4/2004 | Lents et al. ................... 62/401 |

* cited by examiner

*Primary Examiner*—William C. Doerrler
(74) *Attorney, Agent, or Firm*—Brinks Hofer Gilson & Lione

(57) ABSTRACT

A refrigeration and air-cycle air conditioning system is provided for a body defining interior space, preferably a stand alone refrigeration cabinet. The air conditioning system includes a unique combination of a compressor, intercooler, expander, motor and plenum to increase the performance of the system making it practical for use in commercial refrigeration.

28 Claims, 9 Drawing Sheets

AIR-CYCLE AIR CONDITIONING SYSTEM FOR COMMERCIAL REFRIGERATION

FIELD OF THE INVENTION

The present invention relates generally to refrigeration and air conditioning systems, and more particularly relates to air-cycle or Brayton cycle air conditioning systems.

BACKGROUND OF THE INVENTION

Present day commercial refrigeration systems typically employ a two-phase cycle with a refrigerant that alternates between gaseous and liquid states. The systems utilize refrigerants such as Freon or R-134a to provide large cooling capacities. The refrigerant cycle for these systems include the use of a compressor, an evaporator, a condenser and expansion device and numerous refrigerant hoses. Such systems require a closed piping circuit to isolate the pollutional refrigerant from the environment. Further, these refrigeration systems at their end transfer heat through air or another gas, and hence require both a primary cooling medium, i.e. the refrigerant, and a secondary cooling medium, i.e. the air that transfers the heat from the object to be cooled. Not only are these systems expensive and require stringent containment of the refrigerant, the refrigerant level must also be monitored and refilled during the life of the system.

Open air-cycle air conditioning systems, also known as a Brayton cycle system or open reverse Brayton cycle, are known. With such a system the air (or another gas) itself is the working medium in the refrigeration cycle, and there is no need for a special refrigerant that is cycled through the system. Unfortunately, the air-cycle air conditioning system typically has a very small cooling capacity in comparison with a conventional refrigerant based system. These open air-cycle air conditioning systems are employed mainly in airplanes, where there is a ready availability of compressed air which can be tapped directly off the main engine super charger or jet engine compressor. Unfortunately, in stand alone refrigeration systems there is no such supply of compressed air, and hence the small cooling capacity in combination with a low overall efficiency or coefficient of performance (COP) of open air-cycle for refrigeration systems have made them commercially impracticable. Accordingly, there exists a need to provide a commercial refrigeration system for conditioning air utilizing an open air-cycle air conditioning system.

BRIEF SUMMARY OF THE INVENTION

The present invention provides refrigeration using an air-cycle air conditioning system for a body defining interior space, preferably a stand alone refrigeration cabinet. The air conditioning system includes several features which increase the overall COP of the system making it practical for use in commercial refrigeration.

In one embodiment, a unique plenum is employed. The system includes a compressor receiving air from the interior space, an intercooler receiving pressurized air from the compressor, and an expander receiving cooled pressurized air from the intercooler. The expander removes work from the air by reducing its pressure, and provides the cold air to a mixing chamber defined by the plenum. The plenum also includes an inlet port and an outlet port in communication with the mixing chamber and the interior space. The inlet port receives air from the interior space for mixing with the cold air from the expander to provide mixed air to the interior space through the outlet port.

According to more detailed aspects, a fan is preferably provided in communication with the mixing chamber for flowing air through the plenum, and most preferably is positioned proximate the inlet port of the plenum. The plenum may also define an intake chamber which is separate from the mixing chamber. The intake chamber is in communication with an inlet of the compressor, and preferably includes a baffle to reduce the noise generated by the compressor's intake of air. The plenum preferably is an enclosure defined by opposing side walls and opposing end walls connected by a bottom wall. The plenum is structured to collect moisture condensing from the mixing of interior air and cold air in the mixing chamber. The collected moisture may be provided to the compressor, preferably at an inlet of the compressor.

The air conditioning system preferably forms a cartridge defined by a housing enclosing the compressor, intercooler and expander. In an alternate embodiment, the plenum may be integrally formed with the housing and defined in part by various walls of the housing and an internal wall extending through the housing.

An electric motor is preferably utilized to drive the compressor or expander. The electric motor is of high efficiency, and the motor and controller sub-system are preferably at least 90% efficient. The electric motor may directly drive one of the compressor and expander by an integral combination of the drive shafts. Alternatively, a belt and pulley system may be utilized to link the expander and compressor to the electric motor. An expandable shroud preferably is utilized to cover the belt and pulley system.

In another embodiment, the air conditioning system includes a compressor, an intercooler and an expander operating as noted above. The expander and compressor preferably have an efficiency of at least 85%, and are preferably screw-type machines. The electric motor and controller sub-system preferably has an efficiency of at least 90%. Further, the intercooler preferably has an effectiveness of at least 90%.

In another embodiment, the air conditioning system includes a compressor, an intercooler, and an expander operating as noted above. The system preferably also includes a temperature sensor positioned upstream of the compressor. The temperature sensor detects the temperature of air going into the compressor from the interior space of the body. A controller is operatively connected to the motor to control the speed of the compressor based on a control algorithm. The algorithm preferably utilizes the temperature of the air going into the compressor and regulates the pressure of the air exiting the compressor. The pressure may be regulated by controlling the exhaust valve of the compressor. Alternatively, the algorithm may control the speed of the compressor, which determines the mass flow rate of air through the system as well as exiting the expander for mixing with air from the interior space. In this manner, the speed of the compressor, preferably controlled by the electric motor, can be regulated based on the air pressure exiting the compressor to vary the amount of cooling and work performed by the system.

BRIEF DESCRIPTION OF THE DRAWINGS

The accompanying drawings incorporated in and forming a part of the specification illustrate several aspects of the present invention, and together with the description serve to explain the principles of the invention. In the drawings.

DETAILED DESCRIPTION OF THE INVENTION

Figure 1:
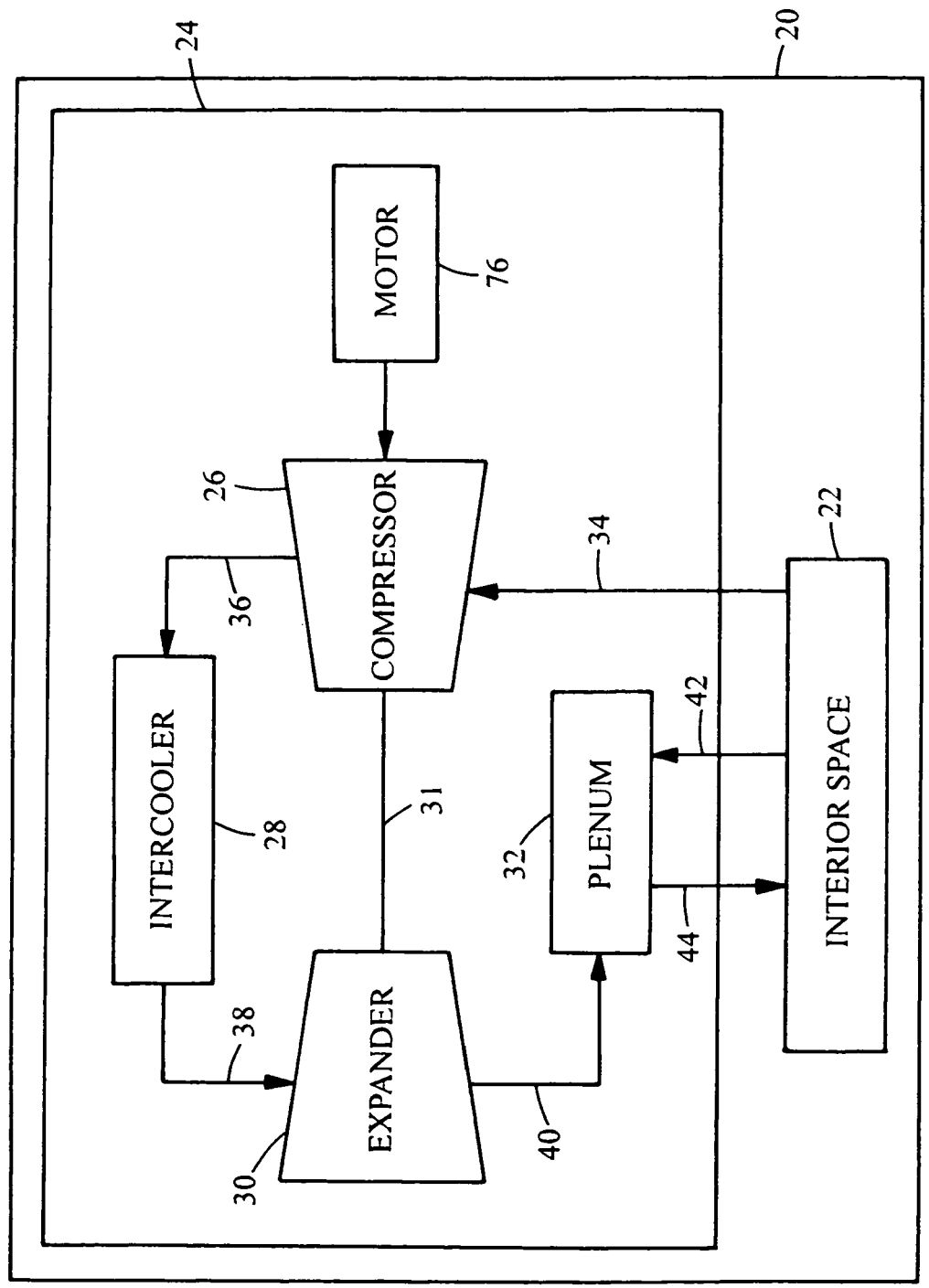
FIG. 1 is a schematic view of the air conditioning system constructed in accordance with the teachings of the present invention.

Turning now to the figures, FIG. 1 depicts a schematic view of a refrigeration body 20 having an interior space 22 to be cooled by an air-cycle air conditioning system 24 constructed in accordance with the teachings of the present invention. The body 20 can represent numerous refrigeration structures, but in the preferred embodiment is a stand alone refrigeration cabinet having an interior space 22 containing a product to be cooled.

The air conditioning system 24 is an air-cycle system or open Brayton refrigeration cycle system having a compressor 26, intercooler 28 and expander 30. The compressor 26 and expander 30 are preferably driven by an electric motor 76. Air from the interior space 22 is drawn into the compressor 26 as indicated by arrow 34. It should be noted that the supply air could be supplied by a combination of air sources and not just from the interior chamber 22 intended for cooling. For example, the air supply could be supplemented by ambient air from outside the body 20. The compressor 26 can also receive air from the plenum 32, and hence air indirectly from the interior space 22.

The compressor 26 compresses and pressurizes the air, thereby increasing its temperature. The compressor 26 raises the pressure of the air to a suitable pressure ratio that can be set based on the particular application and cooling requirements. The compressor 26 has a discharge port which routes compressed air to the intercooler 28. The intercooler 28 receives the pressurized air, indicated by arrow 36, from the compressor 26. The intercooler 28 is preferably a down-flow or cross-flow intercooler, with a series of axial passages used to route air through the intercooler 28 in order to cool it, as is known in the art. If required, the intercooler 28 will have a condensate purging feature that acts to eliminate any condensation of water vapor that may occur in the intercooler 28. The condensate that is removed from the intercooler 28 can be routed to the compressor 26 intake port and allowed to enter the compressor in order to enhance the compressor efficiency.

The intercooler 28 removes heat from the air and supplies pressurized cooler air to the expander 30 as indicated by arrow 38. The expander 30 removes work from the air by reducing the pressure of the air, thereby cooling the same. As the air passes through the expander 30, a shaft coupled to the expander 30 is forced to rotate. This rotating shaft provides some work back to the system 24 and assists with the rotation of the compressor 26. A common shaft 31 has been depicted in FIG. 1. Any condensation that forms on the exterior of the expander 30 or that may exit the expander discharge port will be managed in a similar manner in which the condensate within the intercooler 28 was managed, i.e. it can be routed to the compressor intake for enhanced performance.

The cold air, indicated by arrow 40 is provided to a plenum 32 which is utilized to mix and eject cooled air, indicated by arrow 44, to the interior space 22. A plenum, as used herein, refers to an enclosure defining a space for holding air, and the plenum 32 will be described in more detail below. The plenum 32 receives secondary air indicated by arrow 42 from the interior space that is mixed with the cold air 40 exiting the expander 30 and ejected to provide cooled air 44 to the interior space 22 and body 20.

In order to further increase the COP of the air conditioning system 24 of the present invention, special components have been selected for the particular application previously described. Preferably, both the compressor 26 and expander 30 are screw rotor devices having an efficiency of at least 85%. A preferred screw-type compressor or expander is described in U.S. Pat. No. 6,599,112, the disclosure of which is incorporated herein in its entirety by reference. Further, the intercooler 28 preferably has an effectiveness (i.e. ejected heat per unit area) of at least 90%. The motor 76 is preferably a small motor having a high efficiency, preferably at least 90% efficient. One preferred motor is a pancake-type motor constructed in accordance with U.S. Pat. No. 5,744,896.

Figure 2:
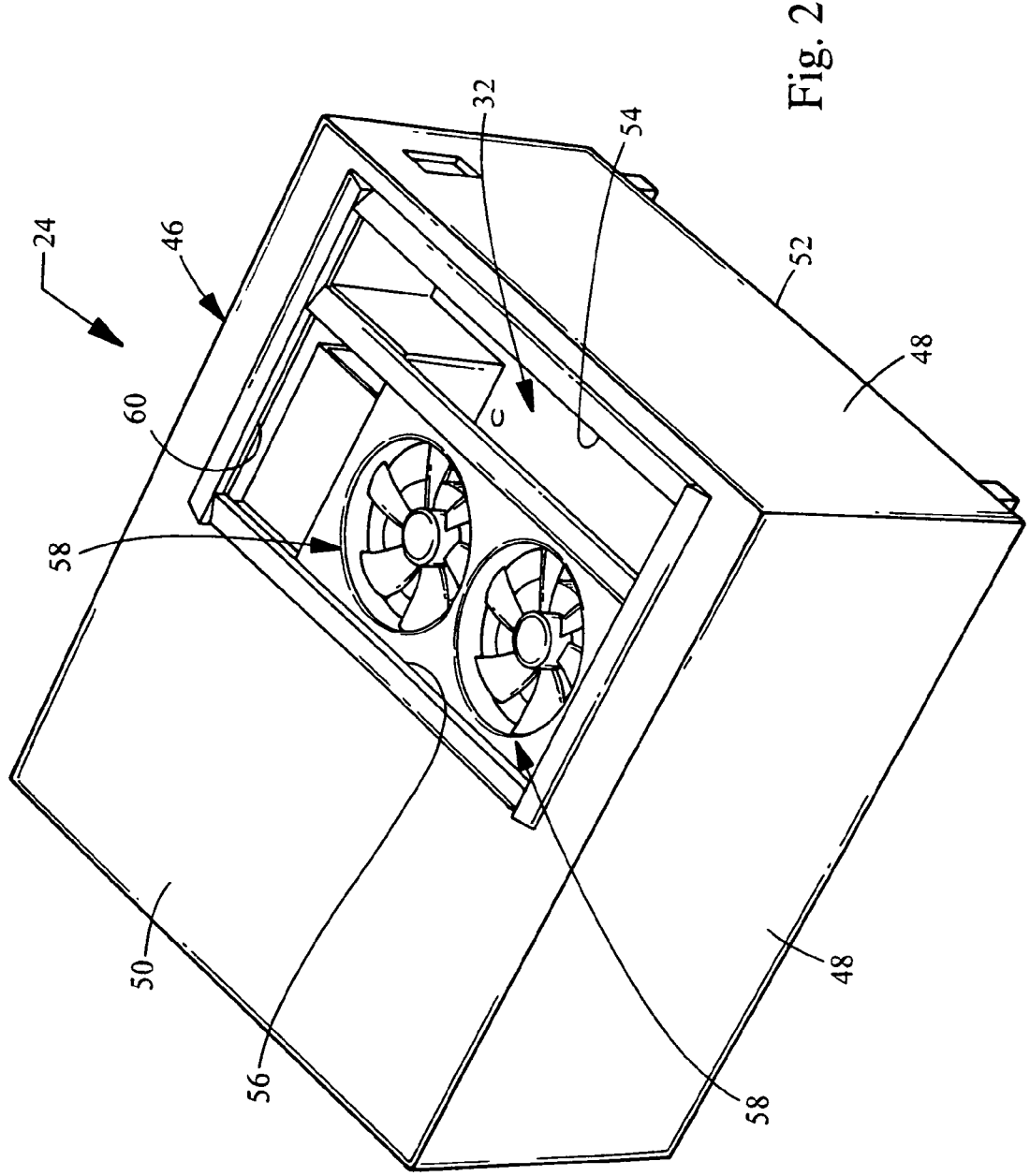
FIG. 2 is a perspective view of the air conditioning system of FIG. 1.
Figure 3:
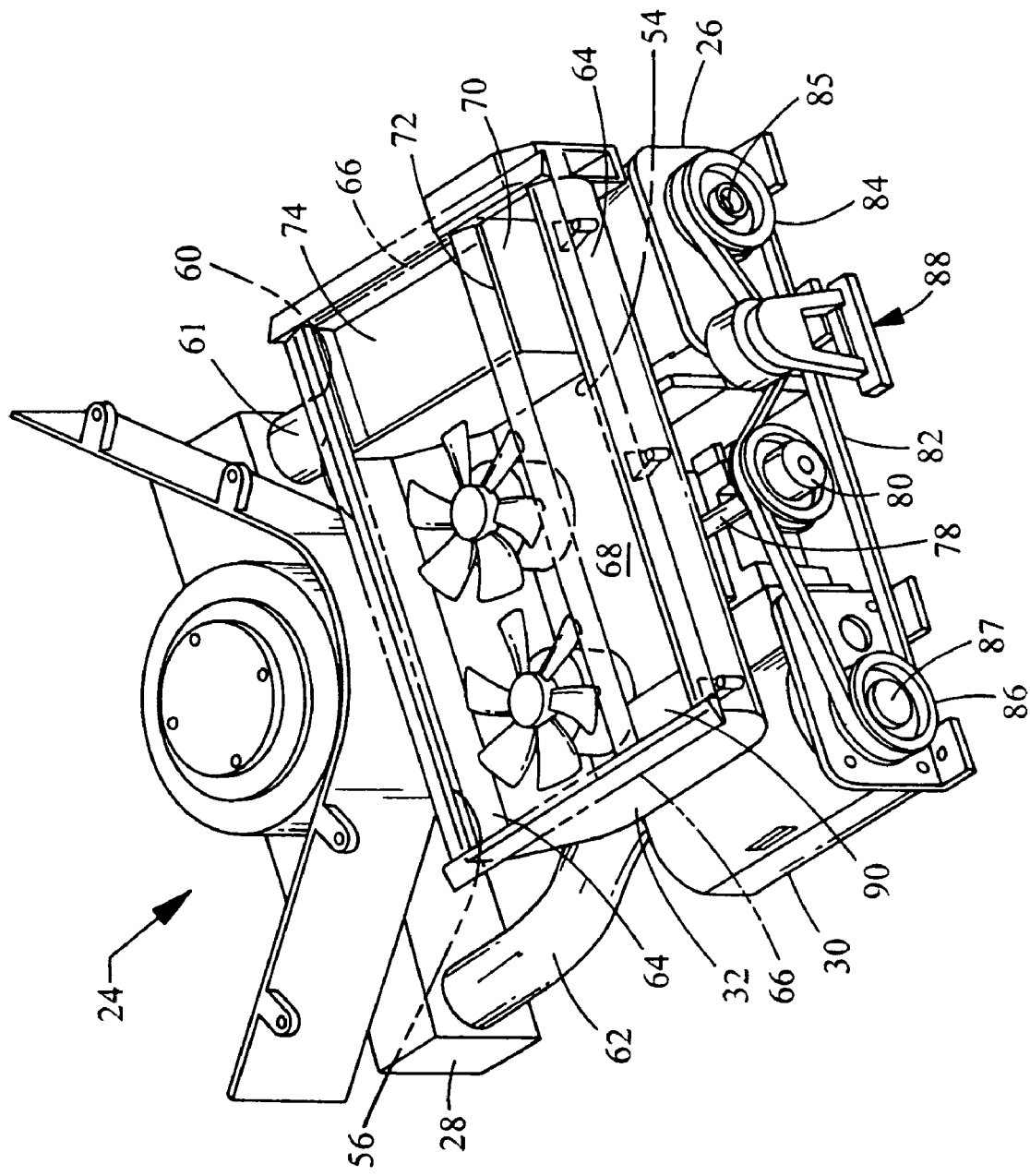
FIG. 3 is perspective view of the air conditioning system of FIG. 2 having its cover removed to reveal the internal components.

The air conditioning system 24 is preferably formed as a cartridge 46 as is shown in the perspective view of FIG. 2. The cartridge 46 includes a housing defined by four side walls 48, a top wall 50 and a bottom wall 52. The top wall 50 preferably defines a inlet 56 and outlet 54 leading to the plenum 32. The top wall 50 also preferably defines a second inlet 60 which provides an air pathway leading to the compressor 26. The inlet 56 is regulated by way of a fan 58 and preferably two fans 58 placed side by side which draw air into the plenum 32. The fans 58 are fitted inside the inlet 56 as shown in FIG. 2. The higher temperature air 42 drawn in by fans 58 circulates and mixes with the cold air 40 from the expander 30 within the mixing chamber 68 of the plenum 32 (FIG. 3). The same axial fans 58 create an air flow through the mixing chamber 68 which pushes the mixed air 44 back into the interior space 22 via the rectangular shaped outlet 54 which may be attached to duct work within the refrigeration body 20.

The air conditioning system 24 is shown in FIG. 3 with the cover elements 48, 50, 52 removed. The compressor 26 is connected to the intercooler 28 by way of conduit 61. A muffler may be interposed between the compressor 28 and intercooler as shown. The intercooler 28 is in communication with the expander 30 by way of a conduit 62, where a muffler is also interposed. The expander 30 has a discharge block 90 which is in communication with a discharge port of the expander 30 and the plenum 32. It can be seen that the plenum 32 is constructed of two curved side walls 64 and two opposing end walls 66, all of which is connected by a bottom wall 68. The plenum 32 is upwardly opening and frame members (shown in dotted lines) of the upper wall 50 of the cartridge housing 46 define the inlet 56 and outlet 54 in relations to the plenum 32. The plenum is positioned proximate the compressor 26 and expander 30, and preferably vertically above the compressor 26 and the expander 30.

Figure 4:
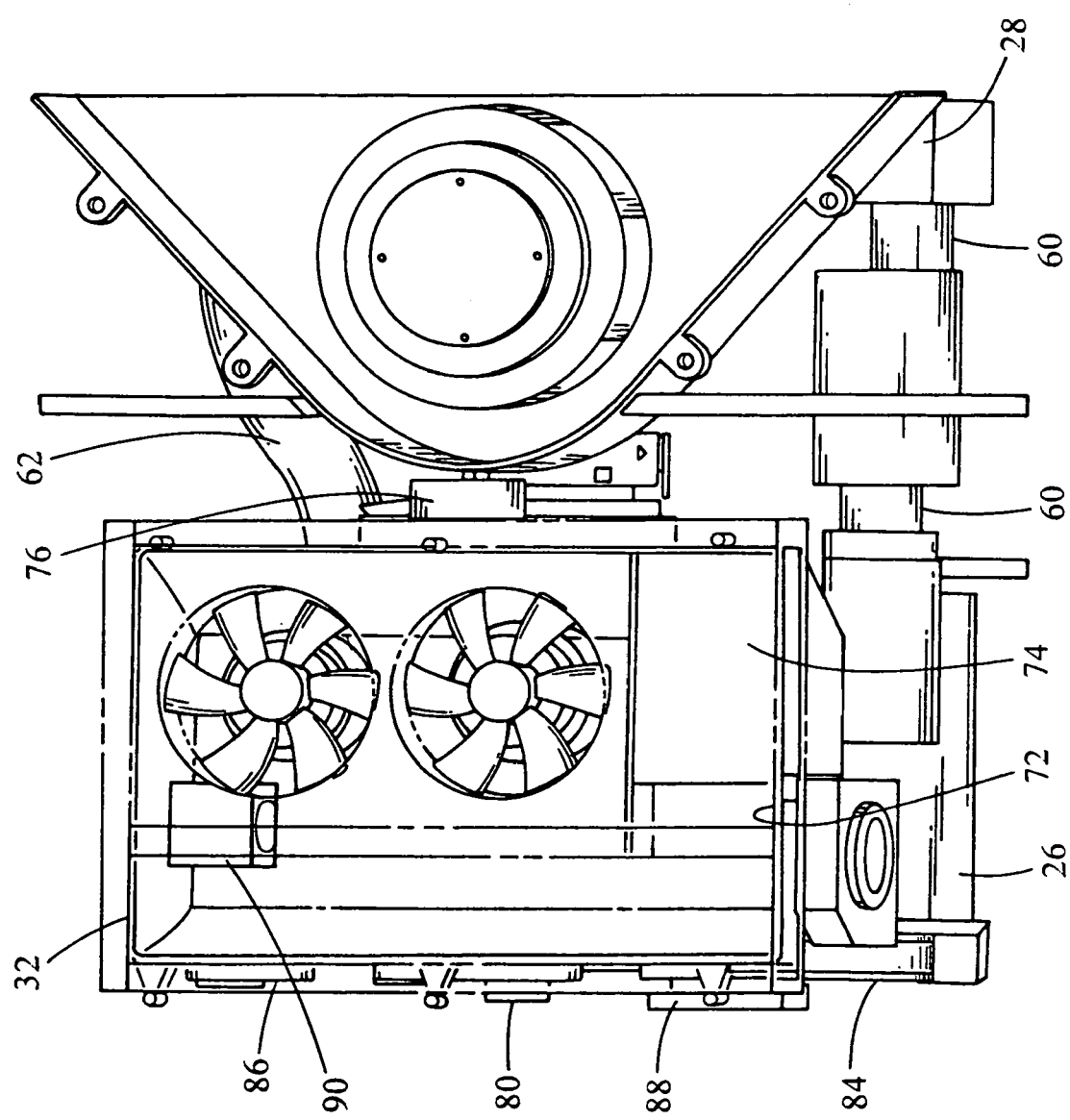
FIG. 4 is a top view of the air conditioning system depicted in FIG. 3.

With reference to FIGS. 3 and 4, a pancake-type motor 76 can be seen which has an output shaft 78 driving an output pulley 80. The pulley 80 drives a belt 82 which is operatively connected to the compressor 26 and expander 30. More particularly, the compressor 26 includes an input pulley 84 and input shaft 85 which is driven by the belt 82. Likewise, the expander 30 includes an input pulley 86 connected to an input shaft 87 which is also driven by the belt 82. An idler system 88 is provided to ensure adequate tension in the belt 82 and to insure smooth operation of the drive system. It will be recognized that by way of this belt and pulley system, the expander 30 may provide power back to the system by assisting with rotation of the compressor 26. As a result, the overall input power requirement for the electric motor 76 is reduced, since the expander 30 is putting some work back into the system 24. The belt pulley system of the present invention is not limited to a single belt system, but can be accomplished by means of transferring a net compressor input power via any drive system, such as the common shaft 31 depicted in FIG. 1, or the direct drive configuration described herein below.

Figure 5:
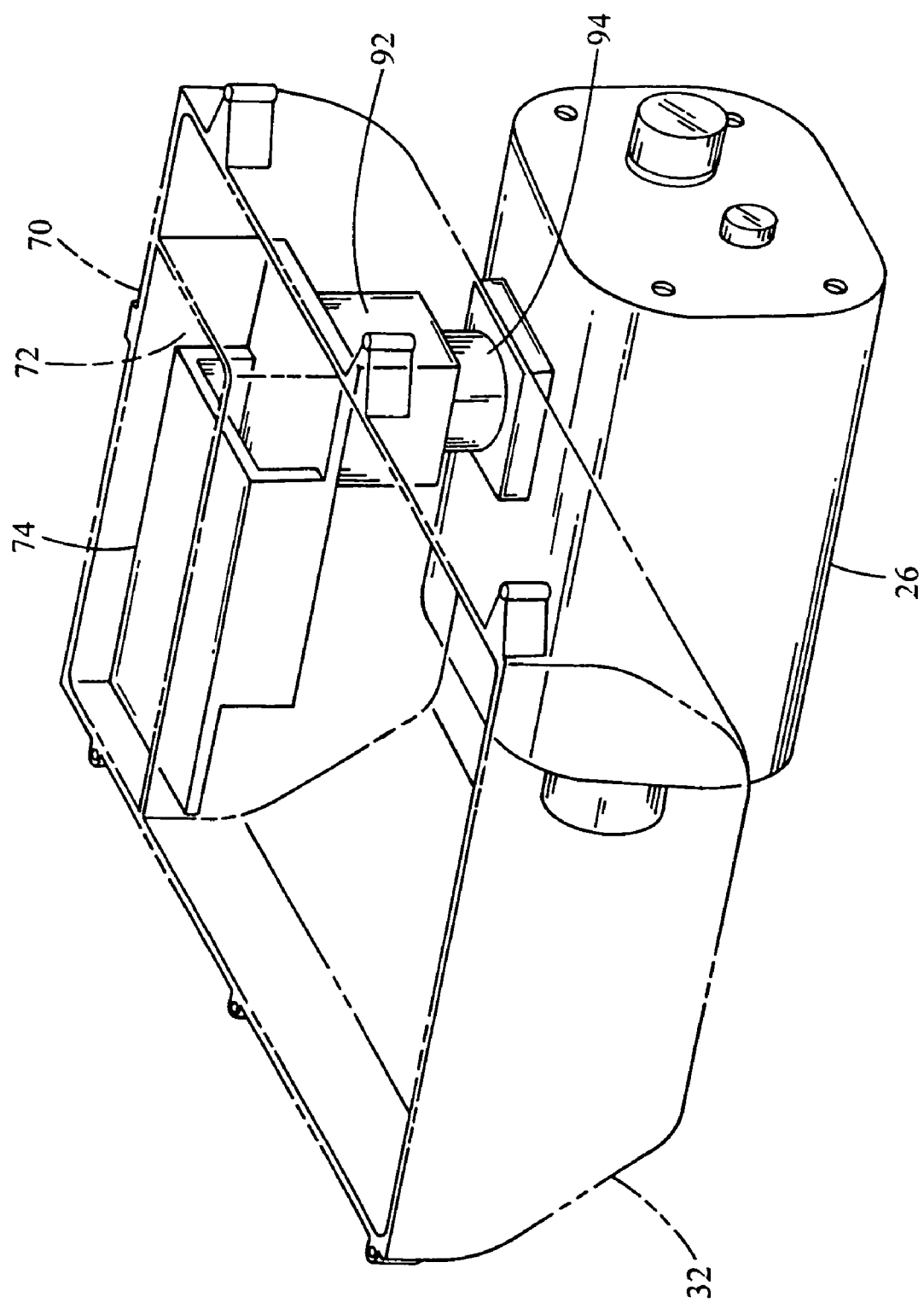
FIG. 5 is a perspective view showing the air intake system for the compressor forming a portion of the air conditioning system depicted in FIGS. 1–4.

The plenum 66 also includes an L-shaped inner wall 70 which defines a intake chamber 72 leading to the compressor 26. As is best seen in FIG. 5, the intake chamber 72 includes a baffle 74 which provides a torturous pathway leading to an intake block 92 connected to an inlet 94 of the compressor 26. The baffle 74 is utilized to reduce the noise generated by the intake of air into the compressor 94. The intake of the compressor 26 also preferably includes a filter designed for use with the compressor 26.

Figure 6:
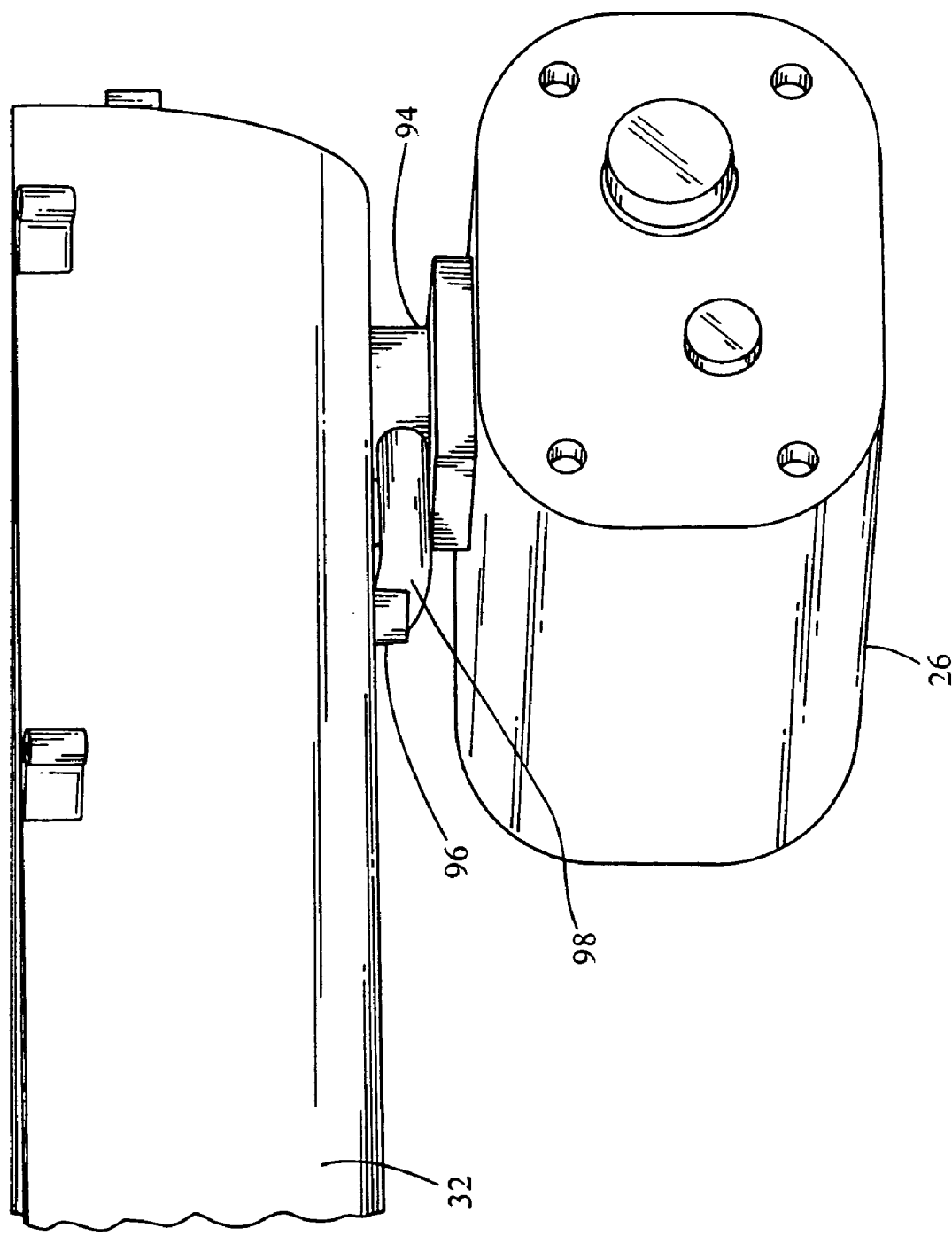
FIG. 6 is a perspective view, partially cut away, of the compressor and plenum forming a portion of the air conditioning system depicted in FIGS. 1–4.

As shown in FIG. 6, the plenum 32 includes a drain port 96 which is connected to the inlet 94 of the compressor 26 by way of a conduit 98. In this manner, moisture collected inside the plenum 32 due to the mixing of cold air exiting the expander 30 and the relatively warmer air entering the plenum 32 via inlet 56 and fans 58 will result in condensate forming on the interior of the plenum 32. The curved side walls 64 guide the moisture to the drain 96 leading to the compressor 26. Additionally, the bottom wall 52 is slightly sloped to guide the moisture to the drain 96.

Figure 7:
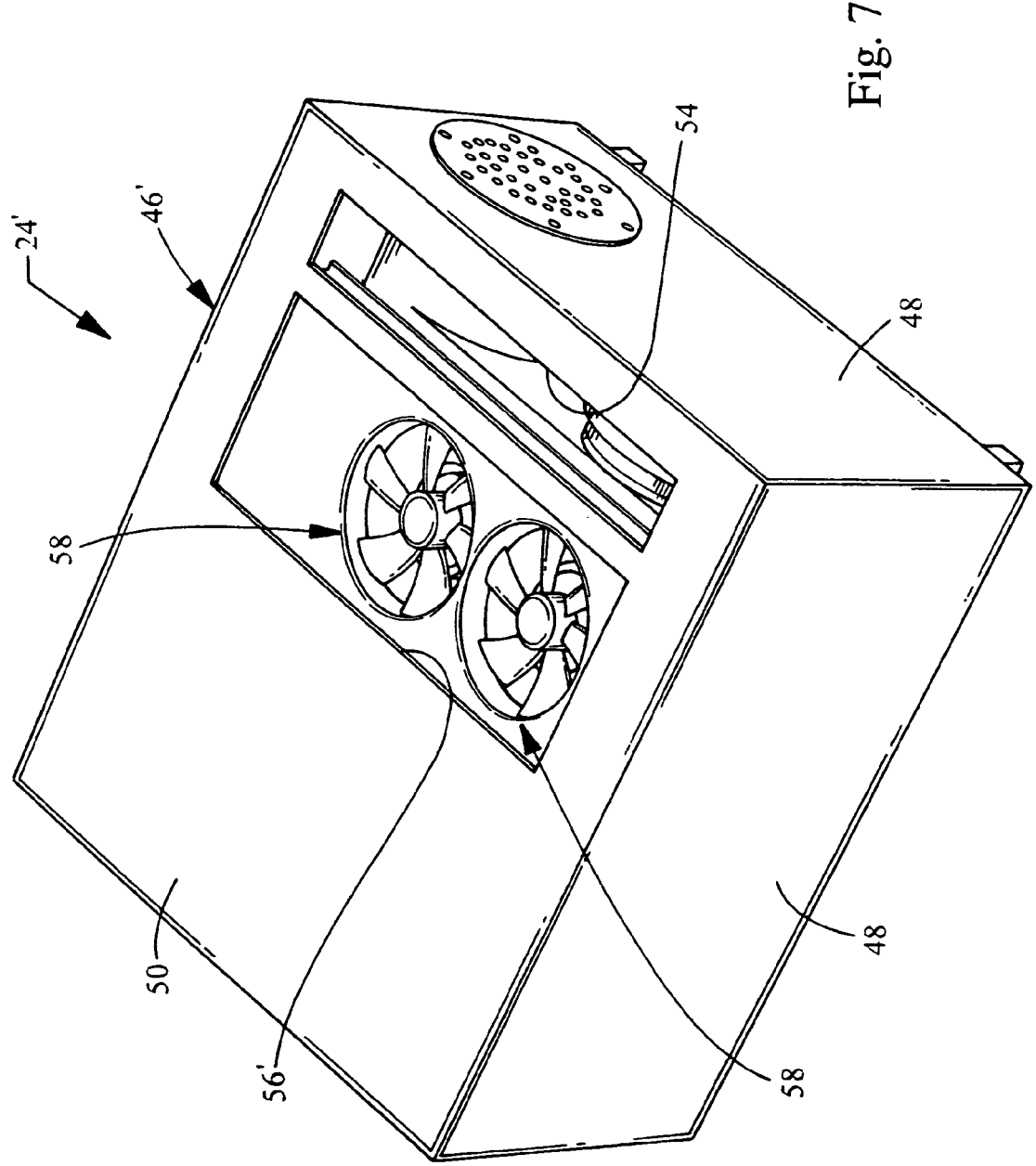
FIG. 7 is a perspective view of an alternate embodiment of an air conditioning system schematically depicted in FIG. 1.
Figure 8:
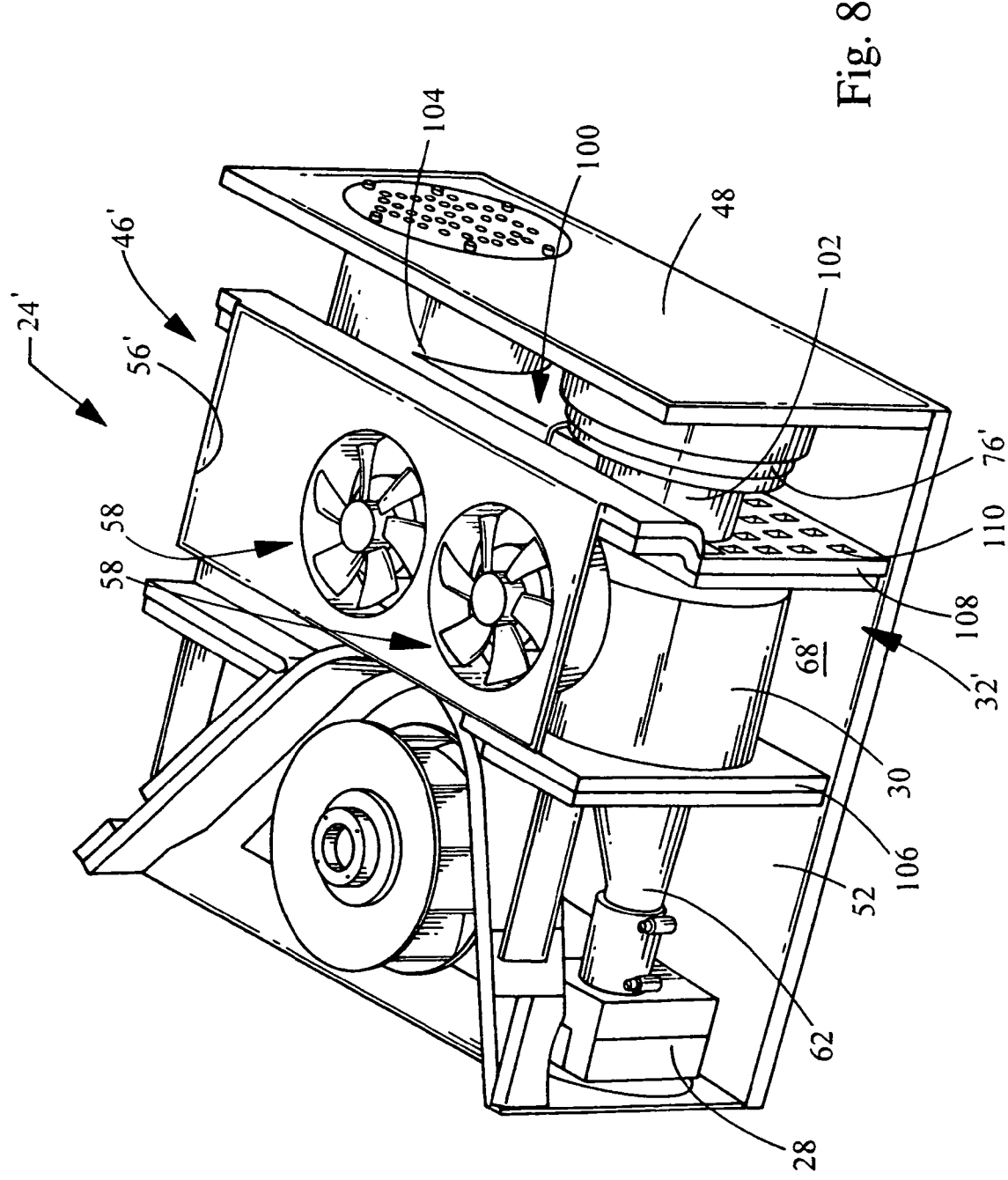
FIG. 8 is a perspective view of the air conditioning system of FIG. 7 having a portion of the outer cover removed to reveal the internal components.
Figure 9:
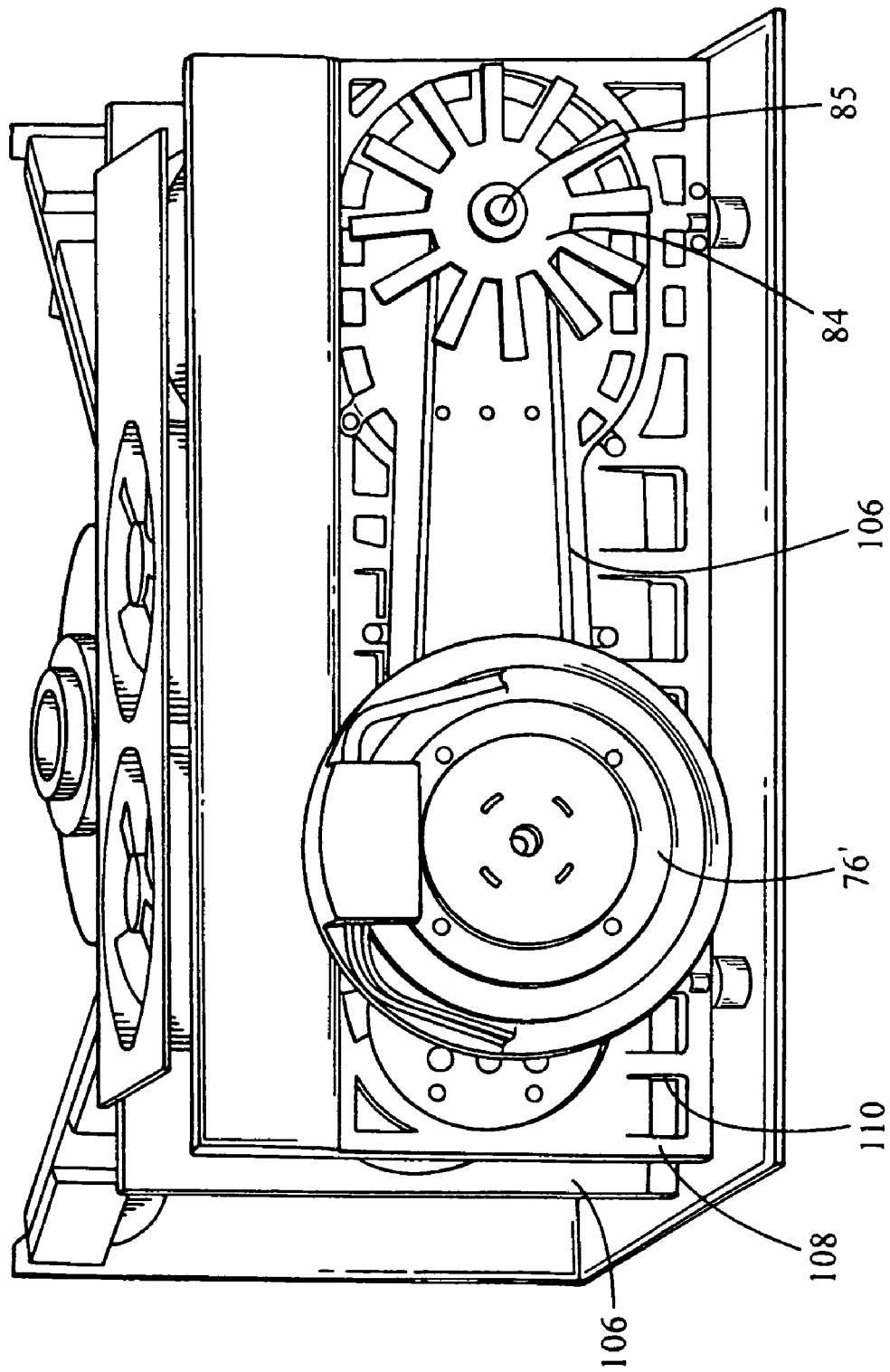
FIG. 9 is a front perspective view of the air conditioning system depicted in FIG. 7 having the front cover removed to reveal the internal components.

Another embodiment of the air conditioning system 24' is shown in FIGS. 7, 8 and 9. Modified components will be referred to by common reference numerals and denoted with prime. The cartridge housing 46' includes an upper wall 50' defining an inlet 56 but not a secondary inlet 60. Fans 58 are provided at the inlet 56 to circulate air through the plenum 32' for mixing and exit via outlet 54. A portion of the cover has been removed in FIG. 8, revealing that a different plenum 32' has been provided.

In this embodiment, the plenum 32' has been integrally formed and incorporated into the housing cartridge 46'. That is, the plenum is formed by the three adjacent side walls 48, the top and bottom walls 50', 52, and an interior wall 106 extending between the side walls 48. The internal wall 106 separates the compressor and expander from the intercooler. In this manner, a separate plenum structure as shown in FIG. 3 need not be formed, while a sufficiently sized mixing chamber 68' can be employed. It will also be recognized that the compressor 26 receives air from the plenum 32' in this embodiment.

It will also be recognized that the electric motor 76' has been provided in a direct drive relationship with the expander 30. As best seen in FIG. 9, the motor 76' is directly connected to an input shaft of the expander 30 and through belt 106 also drives an input shaft 85 of the compressor 26 by input pulley 84. The direct drive configuration allows the system packaging, i.e. cartridge 46 to be more compact and less complex due to the reduction of pulleys and overall belt length. It will be apparent to those skilled in the art that the direct drive configuration can be applied directly to the compressor with a belt extending to a pulley on the expander. As shown in FIG. 8, a shroud 100 is utilized to cover the motor 76', belt 106 and input pulley 84 and shaft 85 of the compressor 26. Preferably, the shroud 100 includes an expander portion 102 and a compressor portion 104 which are telescopically connected so that the distance between the expander 30 and compressor 26 may be varied to insure smooth operation and proper tension in the belt 106.

Capacity control of the system 24 can be achieved by way of regulating the compressor speed through the electric motor 76 or a similar driving device. The speed of the compressor 26 relates directly to the air mass flow rate through the system 24. A temperature sensor detects the temperature of air 34 entering the compressor 26 which is indicative of the temperature of the air in the interior space 22. Based on a desired temperature change and the current compressor speed (i.e. air mass flow rate), a controller (not shown) can utilize the electric motor 76 to increase the compressor speed to attain a requisite air mass flow rate. Based on the value of the air temperature measurement, the compressor speed and thus expander speed would be adjusted accordingly to increase or decrease the mass flow within the system.

The system 24 of the present invention is considered a variable speed system due to the fact that the compressor speed can be adjusted from 0 rpm to any upper limit desired for the appropriate air mass flow rate. It will also be apparent to those skilled in the art that the air conditioning system 24 can be controlled via a fixed speed method. In this case, the algorithm would monitor the air temperature as described above, and when the air temperature approaches a predetermined set point, the algorithm would cycle off the compressor 26 via the motor 76. The mass flow of air would therefore be controlled using a cycling approach of compressor on and off.

Another embodiment of the present invention would control the capacity of the compressor 26 by means of adjusting the pressure ratio of the system. A similar software algorithm would be used to determine when the compressor capacity needed to change. As the capacity requirements decrease, the software algorithm would decrease the pressure ratio. As the capacity requirements increase, the pressure ratio would be increased. Specifically, the compressor 26 includes an exhaust valve (such as those described in U.S. Pat. No. 6,599,112) that can be controlled to regulate the pressure of the air 36 outputted from the compressor 26. The controller would utilize a database of predetermined pressure ratio values corresponding to air intake temperature, and control the exhaust valve to achieve the desired temperature of air in the interior space 22.

In addition to the benefits of eliminating the use of a refrigerant, the utilization of the air-cycle air conditioning system 24 in a system having the air from a confined interior space 22 continually recycled through the air conditioning system 24 provides further benefits. Specifically, as the air in the interior space 22 is cooled by the air conditioning system 24, the temperature of the air entering the compressor (indicated by arrow 34) will be decreased and the amount of work required by the compressor 26, intercooler 28 and expander 38 will be reduced as the entire system approaches a steady state condition. The coefficient of performance (COP) of the air conditioning system 24 of the present invention is higher as the system approaches a steady state condition compared to prior refrigeration systems utilizing refrigerants. As is known in the art, coefficient of performance refers to the refrigeration capacity (determined based on the enthalpy of the starting and ending temperatures of the air) divided by the net work performed by the system 24, (which is primarily the compressor).

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An air cycle air conditioning system for a body defining an interior space, the air conditioning system comprising:
    a compressor receiving air from the interior space and pressurizing the air;
    an intercooler receiving pressurized air from the compressor and removing heat from the air;
    an expander receiving cooler pressurized air from the innercooler and removing work from the air by reducing the pressure of the air; and
    a plenum defining a mixing chamber receiving cold air from the expander, the plenum defining an inlet port and an outlet port in communication with the mixing chamber, the inlet port receiving air from the interior space for mixing with the cold air from the expander, the outlet port providing mixed air to the interior space through the outlet port, the plenum further defining an intake chamber separated from the mixing chamber, the intake chamber being in communication with an inlet of the compressor.

2. The air conditioning system of claim 1, further comprising a fan in communication with the mixing chamber for flowing the air through the plenum.

3. The air conditioning system of claim 2, wherein the fan is positioned proximate the inlet port of the plenum and draws air in to the mixing chamber from the interior space.

4. The air conditioning system of claim 1, wherein the intake chamber includes a baffle to reduce the noise generated by the compressor's intake of air.

5. The air conditioning system of claim 1, wherein the plenum collects moisture condensing from the mixing of interior air and cold air in the mixing chamber.

6. The air conditioning system of claim 5, wherein the plenum is structured to provide the collected moisture to the compressor.

7. The air conditioning system of claim 6, wherein the moisture is provided to an inlet of the compressor.

8. The air conditioning system of claim 5, wherein the plenum is positioned vertically above the compressor.

9. The air conditioning system of claim 1, wherein the plenum is positioned proximate the compressor.

10. An air cycle air conditioning system for a body defining an interior space, the air conditioning system comprising:
    a compressor receiving air from the interior space and pressurizing the air;
    an intercooler receiving pressurized air from the compressor and removing heat from the air;
    an expander receiving cooler pressurized air from the intercooler and removing work from the air by reducing the pressure of the air;
    a plenum defining a mixing chamber receiving cold air from the expander, the plenum defining an inlet port and an outlet port in communication with the mixing chamber, the inlet port receiving air from the interior space for mixing with the cold air from the expander, the outlet port providing mixed air to the interior space through the outlet port; and
    the system forming a cartridge defined by a housing enclosing the compressor, intercooler and expander, the plenum being defined by an upper wall, a lower wall and side walls of the housing, and further defined by an internal wall extending between the upper, lower and side walls of the housing.

11. The air conditioning system of claim 10, wherein the body is a standalone refrigeration cabinet receiving the cartridge.

12. The air conditioning system of claim 11, further comprising an electric motor driving one of the compressor and expander, and wherein the housing encloses the electric motor.

13. The air conditioning system of claim 10, wherein the internal wall separates the compressor and expander from the intercooler.

14. The air conditioning system of claim 10, further comprising an electric motor directly driving one of the compressor and expander, an output shaft of the motor being integrally tied to an input shaft of one of the expander or compressor.

15. The air conditioning system of claim 14, further comprising a belt and pulley linking the input shafts of the expander and compressor, and further comprising a shroud covering the belt and pulley.

16. The air conditioning system of claim 15, wherein the shroud includes at least two telescoping shields making the shroud expandable.

17. The air conditioning system of claim 1, wherein the expander and compressor have an efficiency of at least 85%.

18. The air conditioning system of claim 17 wherein the expander and compressor are screw-type expanders and compressors.

19. The air conditioning system of claim 17, further comprising an electric motor driving the compressor and expander, wherein the electric motor has an efficiency of at least 90%.

20. The air conditioning system of claim 19, wherein the intercooler has an effectiveness of greater that 90%.

21. An air cycle air conditioning system for a body defining an interior space, the air conditioning system comprising:
    a compressor receiving air from the interior space and pressurizing the air, the compressor having an actuatable exhaust port;
    an intercooler receiving pressurized air from the compressor and removing heat from the air;

an expander receiving cooled pressurized air from the intercooler and removing work from the air by reducing the pressure of the air;

a temperature sensor positioned upstream from the compressor to sense the temperature of the air going into the compressor from the interior space of the body; and a controller operatively connected to the compressor to control the speed of the compressor based on a algorithm utilizing the temperature of the air going into the compressor.

22. The air conditioning system of claim 21, wherein the controller actuates the exhaust port to regulate the pressure of the air exiting the compressor to control air temperature in the interior space.

23. The air conditioning system of claim 21, wherein the temperature of the air going into the compressor is indicative of the temperature of the air in the interior space.

24. The air conditioning system of claim 21, further comprising an electric motor driving the compressor and expander, and wherein the system forms a cartridge defined by a housing enclosing the compressor, intercooler, expander and electric motor.

25. The air conditioning system of claim 21, further comprising an electric motor driving the compressor or expander, and wherein the speed of the motor and compressor determine the mass flow of air exiting the expander and mixing with the air from the interior space.

26. The air conditioning system of claim 21, further comprising a plenum defining a mixing chamber receiving cold air from the expander, the plenum defining an inlet port and an outlet port in communication with the mixing chamber, the inlet port receiving air from the interior space for mixing with the cold air from the expander, the outlet port providing mixed air to the interior space.

27. The air conditioning system of claim 26, further comprising a fan in communication with the mixing chamber for flowing the air through the plenum.

28. The air conditioning system of claim 26, wherein the plenum is an enclosure defined by a pair of side walls and pair of end walls connected by a bottom wall.

* * * * *

UNITED STATES PATENT AND TRADEMARK OFFICE
CERTIFICATE OF CORRECTION

| | |
|---|---|
| PATENT NO. | : 6,966,198 B2 |
| APPLICATION NO. | : 10/734520 |
| DATED | : November 22, 2005 |
| INVENTOR(S) | : Davide F. Piccirilli et al. |

It is certified that error appears in the above-identified patent and that said Letters Patent is hereby corrected as shown below:

<u>Column 8,</u>
Line 2, after "an effectiveness of" delete "greater that" and substitute -- at least --.

Signed and Sealed this

Twenty-seventh Day of June, 2006

JON W. DUDAS
*Director of the United States Patent and Trademark Office*